United States Patent [19]
Salerno

[11] Patent Number: 5,265,586
[45] Date of Patent: Nov. 30, 1993

[54] BARBEQUE GRILL APPARATUS

[76] Inventor: Rafael Salerno, 1067 Deer Chase, Stone Mountain, Ga. 30088

[21] Appl. No.: 994,362

[22] Filed: Dec. 21, 1992

[51] Int. Cl.$^5$ .............................................. F24C 3/00
[52] U.S. Cl. ............................... 126/41 R; 126/25 R; 99/444; 99/446
[58] Field of Search .............. 126/41 R, 214 D, 25 R; 99/444, 446, 447, 400

[56] References Cited

U.S. PATENT DOCUMENTS

| | | | |
|---|---|---|---|
| 2,940,381 | 6/1960 | Cottongin et al. | 99/445 |
| 4,683,867 | 8/1987 | Beatty | 126/214 D X |
| 4,762,059 | 8/1988 | McLane, Jr. | 126/41 R X |
| 4,787,364 | 11/1988 | Zepeda | 126/41 R |
| 4,878,477 | 11/1989 | McLane | 126/41 R |
| 4,886,044 | 12/1989 | Best | 126/41 R X |
| 5,000,157 | 3/1991 | Harper, Jr. et al. | 126/41 R |
| 5,121,738 | 6/1992 | Harris | 126/41 R |

Primary Examiner—Larry Jones
Attorney, Agent, or Firm—Leon Gilden

[57] ABSTRACT

A barbeque grill includes a first and second deflector plate structure mounted together at an acute included angle therebetween between an underlying heat chamber and an overlying grate of the barbeque grill structure, wherein the first and second deflector plate structure includes baffled floor structure to direct heat to overlying food within the grate and further direct fluid grease and the like along the first and second deflector plates to respective first and second gutters for subsequent accumulation by respective containers mounted exteriorly of the barbeque grill housing.

4 Claims, 4 Drawing Sheets

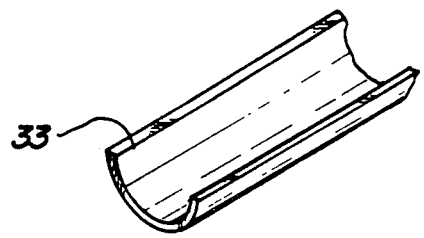
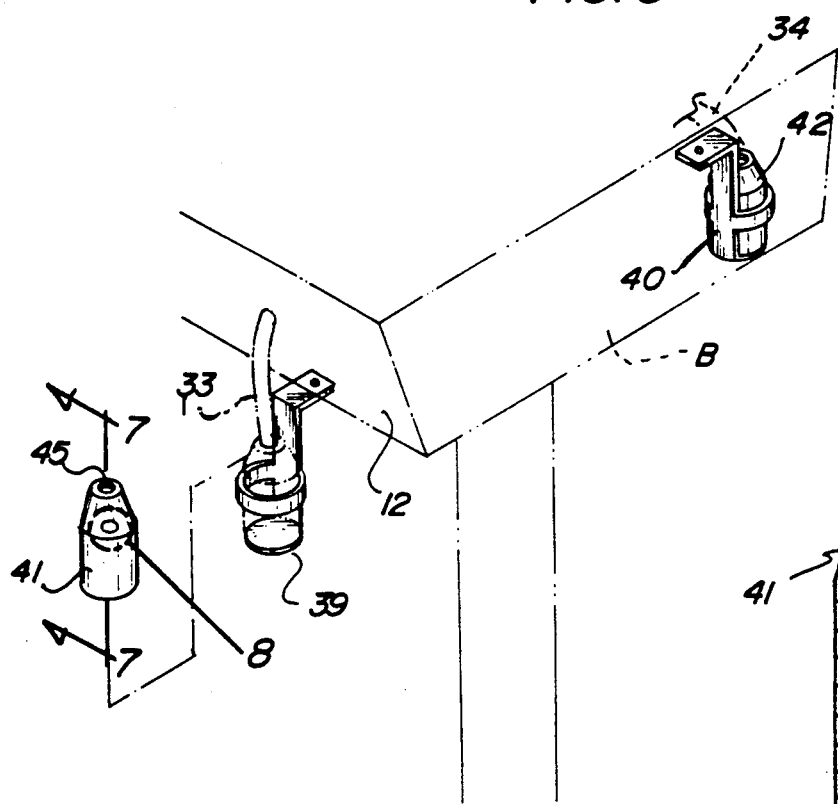
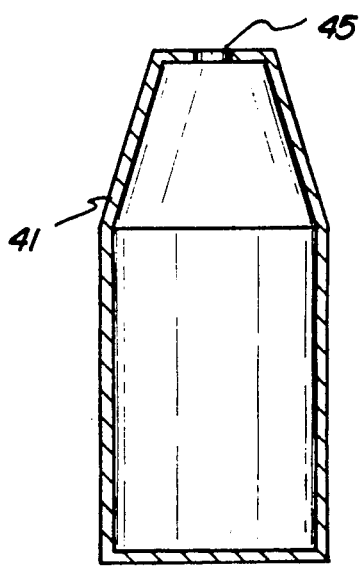

BARBEQUE GRILL APPARATUS

BACKGROUND OF THE INVENTION

1. Field of the Invention

The field of invention relates to barbeque grill apparatus, and more particularly pertains to a new and improved barbeque grill apparatus wherein the same is arranged to provide for heat deflector structure mounted in the grill housing, as well as grease accumulator structure associated therewith.

2. Description of the Prior Art

Barbeque grills of various types have been utilized throughout the prior art and exemplified by the U.S. Pat. Nos. 4,598,634; 3,691,937; 4,317,441; 3,789,748; and 3,596,591.

The instant invention attempts to overcome deficiencies of the prior art by providing for grease deflector structure to provide for simultaneous heating grids, as well as grease accumulating structure.

SUMMARY OF THE INVENTION

In view of the foregoing disadvantages inherent in the known types of barbeque grill apparatus now present in the prior art, the present invention provides a barbeque grill apparatus wherein the same provides a grease deflector structure as well as a grease accumulating structure. As such, the general purpose of the present invention, which will be described subsequently in greater detail, is to provide a new and improved barbeque grill apparatus which has all the advantages of the prior art barbeque grill apparatus and none of the disadvantages.

To attain this, the present invention provides a barbeque grill including a first and second deflector plate structure mounted together at an acute included angle therebetween between an underlying heat chamber and an overlying grate of the barbeque grill structure, wherein the first and second deflector plate structure includes baffled floor structure to direct heat to overlying food within the grate and further direct fluid grease and the like along the first and second deflector plates to respective first and second gutters for subsequent accumulation by respective containers mounted exteriorly of the barbeque grill housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved barbeque grill apparatus which has all the advantages of the prior art barbeque grill apparatus and none of the disadvantages.

It is another object of the present invention to provide a new and improved barbeque grill apparatus which may be easily and efficiently manufactured and marketed.

It is a further object of the present invention to provide a new and improved barbeque grill apparatus which is of a durable and reliable construction.

An even further object of the present invention is to provide a new and improved barbeque grill apparatus which is susceptible of a low cost of manufacture with regard to both materials and labor, and which accordingly is then susceptible of low prices of sale to the consuming public, thereby making such barbeque grill apparatus economically available to the buying public.

Still yet another object of the present invention is to provide a new and improved barbeque grill apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic view, taken along the lines 5—5 of FIG. 3 in the direction indicated by the arrows.

FIG. 6 is an isometric illustration of the grease collecting containers employed by the invention on opposed sides of the barbeque grill housing.

FIG. 7 is an orthographic view, taken along the lines 7—7 of FIG. 6 in the direction indicated by the arrows.

DESCRIPTION OF THE PREFERRED EMBODIMENT

Figure 1:
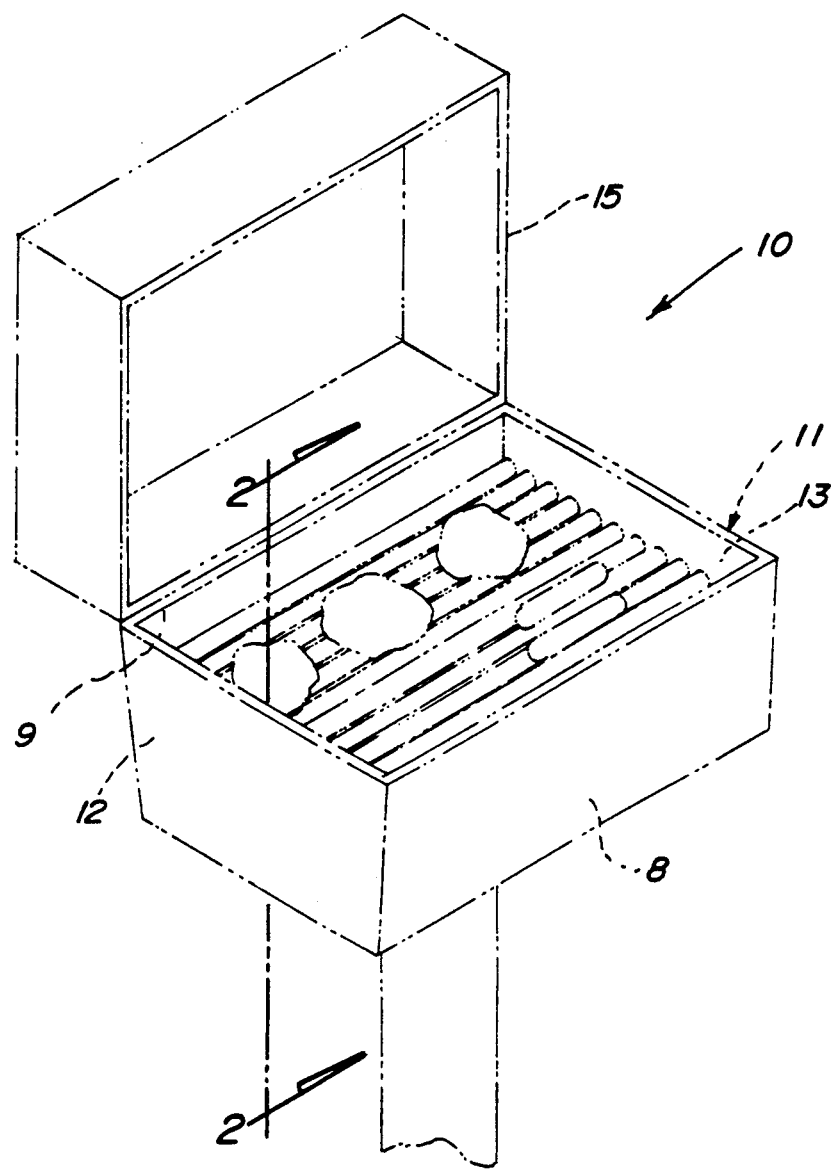
FIG. 1 is an isometric illustration of the invention.
Figure 2:
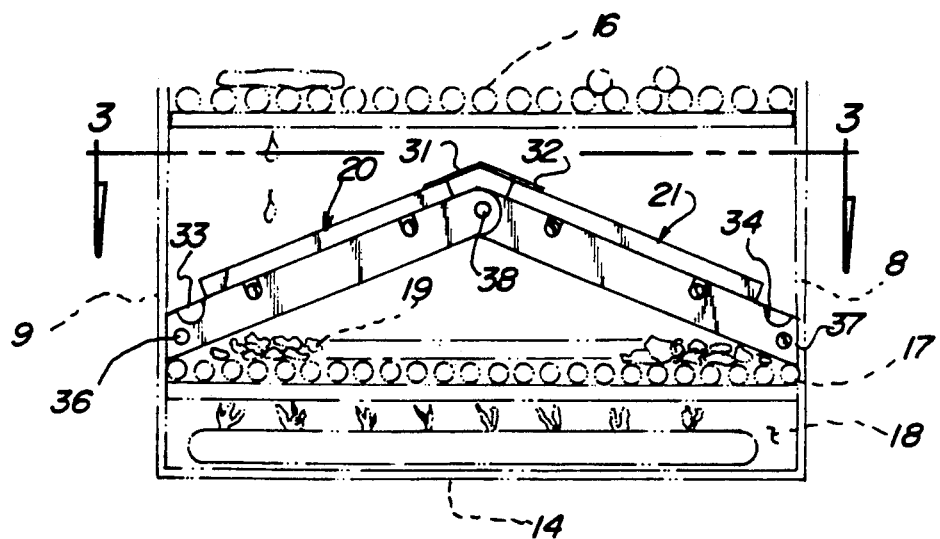
FIG. 2 is an orthographic view, taken along the lines 2—2 of FIG. 1 in the direction indicated by the arrows.
Figure 3:
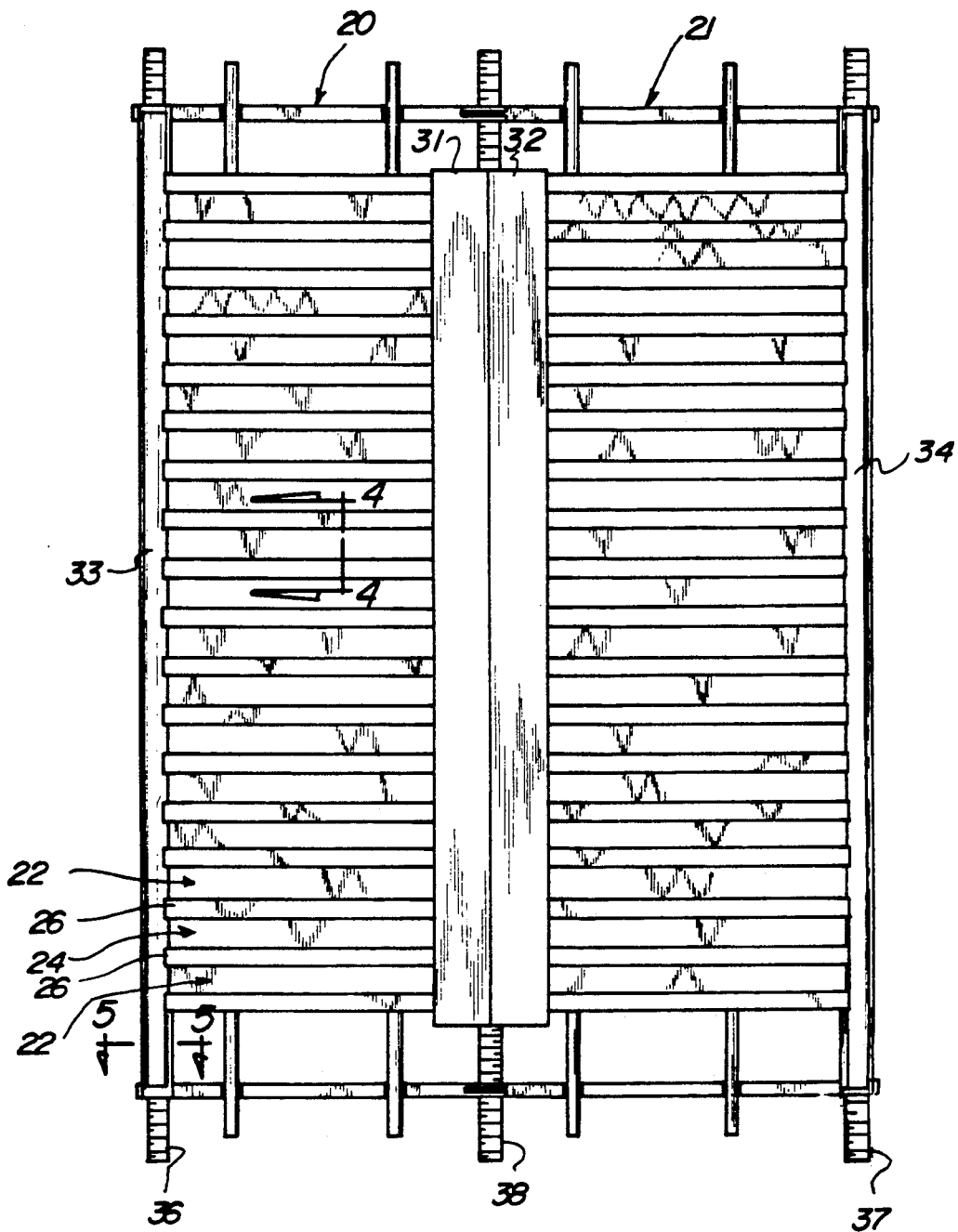
FIG. 3 is an orthographic view, taken along the lines 3—3 of FIG. 2 in the direction indicated by the arrows.
Figure 4:
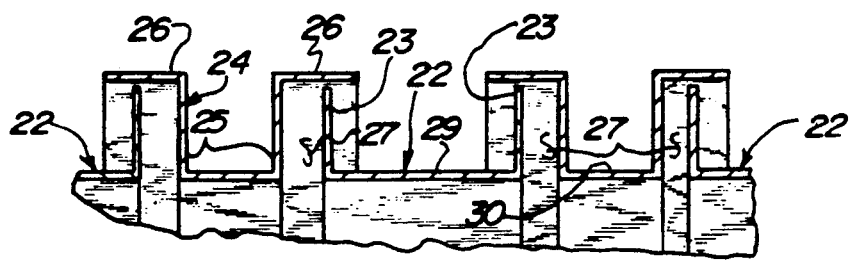
FIG. 4 is an orthographic view, taken along the lines 4—4 of FIG. 3 in the direction indicated by the arrows.

With reference now to the drawings, and in particular to FIGS. 1 to 11 thereof, a new and improved barbeque grill apparatus embodying the principles and concepts of the present invention and generally designated by the reference numeral 10 will be described.

More specifically, the barbeque grill apparatus 10 of the instant invention essentially comprises a housing 11, having a first side wall 12 spaced from a second side wall 13, a housing front wall 8 spaced from a housing rear wall 9, and a housing lid 15 pivotally mounted to the rear wall 9 to extend over the barbeque grill wall structure. A first grate 16 is mounted within the wall structure of the housing in a spaced relationship relative to an underlying second grate 17, with a heat chamber positioned below the second grate 17. The second grate includes heating rocks or medium 19 thereon positioned above the heat source to employ briquettes, natural gas, and the like contemporarily known and utilized in barbeque grill cooking. First and second heating grids 20 and 21 are provided and positioned between the first and second grates 16 and 17 respectively. Each heating grid includes alternating first and second U-shaped floor members 22 and 24. The first U-shaped floor member 22 includes parallel first floor plate side walls 23 and a first floor 29. The second U-shaped floor member 24 includes parallel second floor plate side walls 25 positioned intermediate the first floor plate side walls 23. Further, each of the second floor plate side walls 25 includes a second floor plate top wall 26 to extend over an adjacent first floor plate side wall 23 and thereby provide for a heat chimney 27 between adjacent first and second floor plate side walls 23 and 25 and directed through a spacing below the second floor plate top wall 26 to thereby provide for enhanced heating of the heating grids 20 and 21. It should be further noted that the second U-shaped floor member 24 includes a second floor 30, wherein each of the first and second floors 29 and 30 are arranged in a coplanar relationship. Further, the first and second heating grids 20 and 21 are joined at an intersection and define an obtuse angulated orientation relative to one another. It should be noted that any oblique angle may be provided insofar as the first and second heating grids 20 and 21 are canted downwardly from respective first and second deflector plates 31 and 32 respectively mounted to upper distal ends of each of the first and second heating grids 20 and 21. The first and second deflector plates 31 and 32 are joined together in a generally V-shaped configuration to deflect grease onto the respective first and second floors 29 and 30. Respective first and second gutter channels 33 and 34 are orthogonally mounted to lower distal ends of the first and second floors 29 and 30 of the respective first and second heating grids 20 and 21. The first and second gutter channels 33 and 34 are arranged in fluid communication with respective first and second containers 41 and 42 mounted to respective first and second support brackets 39 and 40 relative to the adjacent first and second side walls 12 and 13. Further, a first and second mounting rod 35 and 36 is mounted to the respective lower distal end of the respective first and second heating grids 20 and 21, with a third mounting rod 37 positioned at the intersection of the first and second heating grids. The support rods are arranged for fixed mounting to the respective first and second side walls 11 and 12 of the housing 11 in any desired manner utilizing fasteners and the like.

Respective first and second hoses 43 and 44 are directed from the respective first and second gutter channels 33 and 34 to respective first and second support containers 41 and 42. Each of the support containers includes a container opening 45 directed through a top wall of each respective container to receive an associated hose of the first and second hoses 43 and 44.

Figure 8:
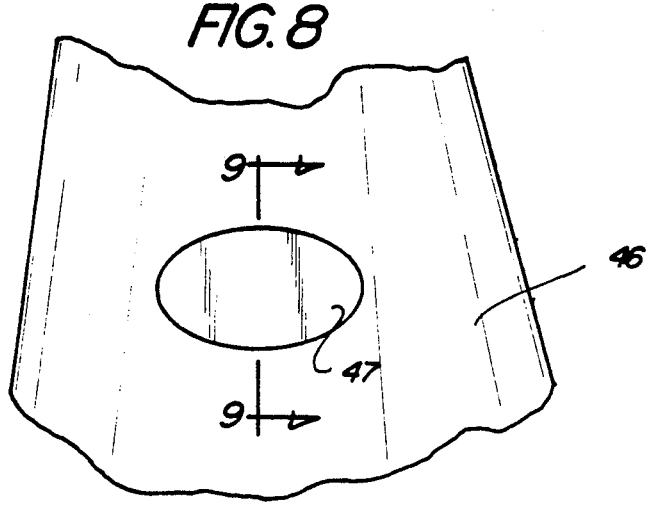
FIG. 8 is an enlarged orthographic view of section 8, as set forth in FIG. 6.
Figure 9:
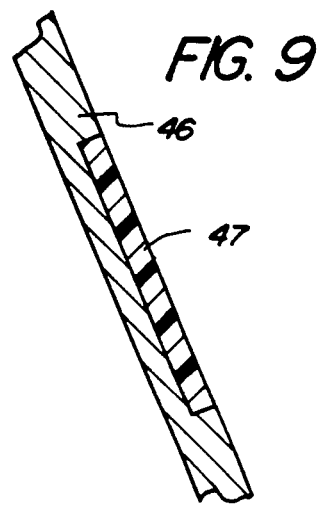
FIG. 9 is an orthographic view, taken along the lines 9—9 of FIG. 8 in the direction indicated by the arrows.
Figure 10:
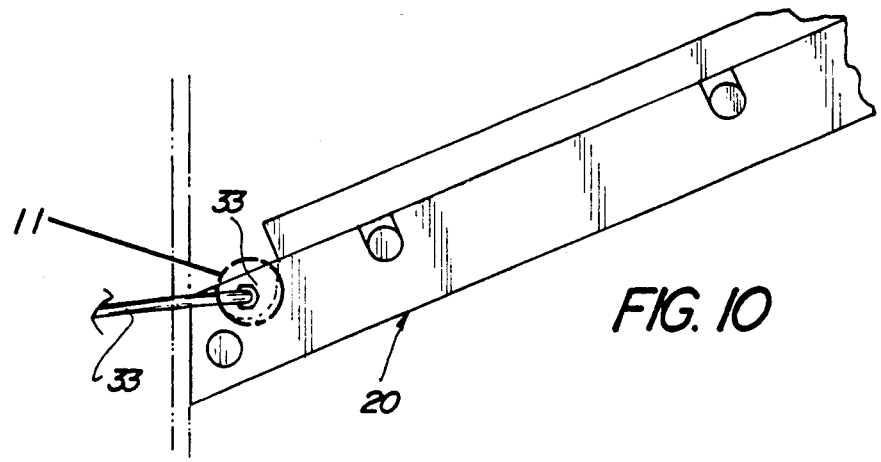
FIG. 10 is an orthographic view of a connector hose associated relative to a grease collecting channel of the invention.
Figure 11:
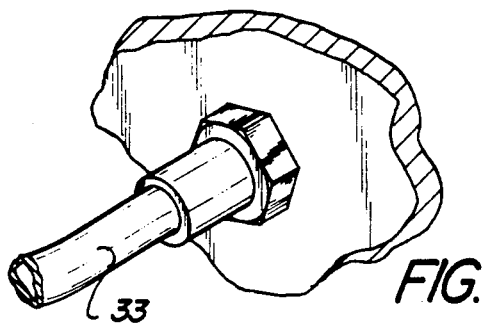
FIG. 11 is an enlarged isometric illustration of section 11, as set forth in FIG. 10.

A modified container structure, as indicated in the FIGS. 8 and 9, includes a container side wall 46 having a recess to receive a wax insert 47 of a predetermined first coloration in contrasting coloration relative to a second coloration of the associated container side wall 46. In this manner, as heated grease is directed into the associated container, the wax is melted and accordingly visual observation indicates the filling of the respective containers as the heated grease rises in the containers relative to the wax insert 47 that is positioned in adjacency to the top wall of the associated container.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A barbeque grill apparatus, comprising,
   a grill housing, the housing having a first side wall spaced from a second side wall, a floor, and a front wall spaced from a rear wall, and
   the housing defining a cavity within the housing above the floor, and
   a first grate mounted within the housing in a spaced relationship relative to the floor, and a second grate mounted within the housing between the first grate and the floor, and
   first and second heating grids mounted coextensively between the first side wall and the second side wall, wherein the first heating grid and the second heating grid are intersecting medially of the first side wall and the second side wall at an intersection, and
   a first deflector plate coextensive with the first heating grid, and a second deflector plate coextensive with the second heating grid, with the first deflector plate and the second deflector plate in contiguous communication relative to one another intersecting at an oblique predetermined angle, with the first heating grid and the second heating grid intersecting at the oblique predetermined angle at the intersection, and the first heating grid having a first gutter channel fixedly mounted to the first heating grid in a spaced parallel relationship relative to the first deflector plate, and the second heating grid having a second gutter channel fixedly mounted to the second heating grid in a spaced relationship relative to the second deflector plate, with the first gutter channel and the second gutter channel arranged in a parallel relationship relative to one another for accommodating grease directed into the first gutter channel and the second gutter channel from the respective first heating grid and the second heating grid, and the first heating grid and the second heating grid each include alternating first and second U-shaped floor members, each first U-shaped floor member includes spaced parallel first floor plate side walls positioned between parallel second floor plate side walls, and the first U-shaped floor member includes a first floor, the second U-shaped floor member includes a second floor, wherein the first floor and the second floor are each coplanar relative to one another, and wherein the second U-shaped floor member includes a second floor plate top wall mounted to each second floor plate side wall, with each second floor plate top wall extending over one of said first floor plate side walls, wherein a heat chimney is directed between adjacent first and second floor plate side walls and below one of the second floor plate top walls.

2. An apparatus as set forth in claim 1 wherein the first gutter channel is arranged in fluid communication to receive fluid from the first and second floor of the first heating grid, and the second gutter channel is arranged to receive fluid from the first and second floor of the second heating grid.

3. An apparatus as set forth in claim 2 including a first bracket mounted to the first side wall, a second bracket mounted to the second side wall, a first container positioned within the first bracket, a second container positioned within the second bracket, a first hose in fluid communication between the first container and the first gutter channel, a second hose in fluid communication between the second container and the second gutter channel.

4. An apparatus as set forth in claim 3 wherein each container includes a container top wall, and each container having a container side wall, and each container having a side wall recess in adjacency to the container top wall, and each recess having a wax insert of a predetermined first coloration in contrasting coloration relative to a second coloration of the container second side wall for indication of accumulation of heated fluid within each of said first container and said second container.

* * * * *